Feb. 21, 1928.
E. H. HANSEN
1,660,161
LIGHT DIMMER RHEOSTAT
Filed Nov. 2, 1923
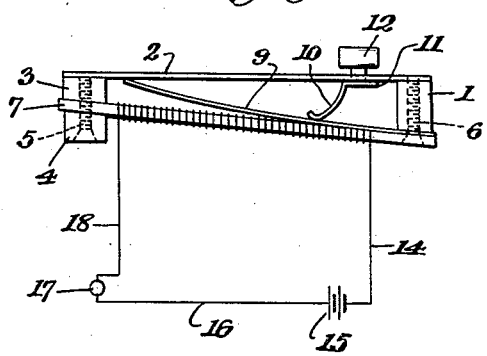
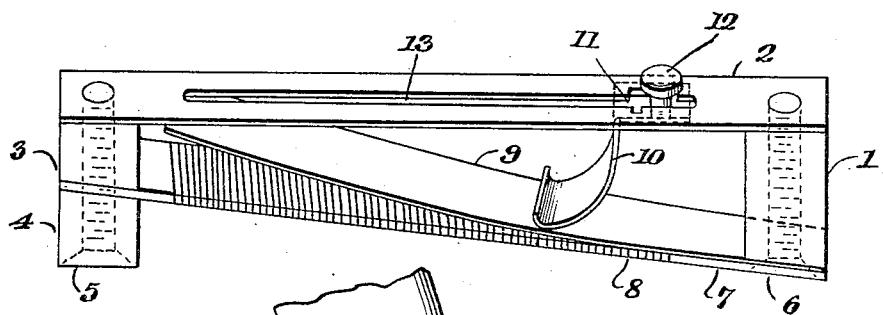
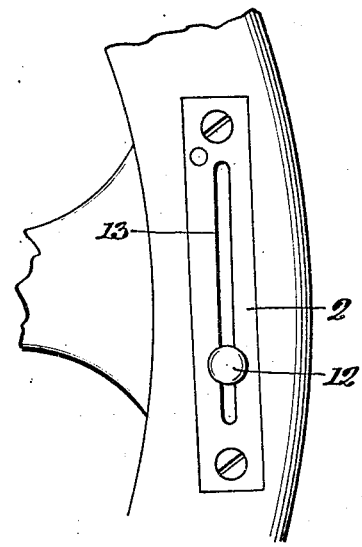
E. H. Hansen
INVENTOR.
Chas. M. C. Chapman,
ATTORNEY.

Patented Feb. 21, 1928.

1,660,161

UNITED STATES PATENT OFFICE.

EDMUND H. HANSEN, OF METUCHEN, NEW JERSEY.

LIGHT-DIMMER RHEOSTAT.

Application filed November 2, 1923. Serial No. 672,330.

This invention has reference to electric regulation and, particularly, relates to the regulation and control of the electric current in a translation circuit.

For the purpose of explaining and demonstrating my invention, I have shown it applied to the steering wheel of a vehicle and adapted for regulating the current used in the electric lighting system of an automobile or other road vehicle. I desire it understood that this application of my invention is not to be taken as a limitation, since the controlling and regulating means may be applied to, or inserted in, any translation circuit, or electric circuits for the purpose of diminishing or increasing the current to be delivered to a predetermined point for service, or may be adapted to any electric circuit in which a variable resistance is useful.

Among the objects of my invention may be noted the following: to provide means by which the current of an electric circuit can be regulated or controlled; to provide means by which the current in a lighting system for automobiles or other vehicles can be regulated or controlled; to provide means by which the strength of a battery, feeding a translation circuit, such as feeding an electric lighting system for vehicles, can be conserved; to provide means by which the lights of an automobile can be dimmed or caused to display any degree of intensity up to maximum; to provide a simple, compact device or regulating element by which the foregoing objects can be attained economically and with facility and with a high degree of efficiency; and to provide means for controlling the current of an electric circuit emanating from any source, and regulating said current so that various lighting effects can be obtained, or various effects in any translation circuit can be secured.

With the above objects in view and others which will be noted during the course of this description, my invention consists in the parts, features, elements and combinations thereof hereinafter described and claimed.

In order that my invention may be clearly understood, I have provided drawings wherein:

Figure 1 is a perspective view of a controlling or regulating device embodying my invention;

Figure 2 is a side elevation of the device of Figure 1 showing also the electric circuit in which the same is included; and Figure 3 is a bottom plan view of a portion of the steering wheel of an automobile, or other road vehicles, showing my invention applied thereto.

Referring to the drawings, the numeral 1 indicates a block forming one end of the frame of my controlling or regulating device, 2 indicating the outer bar of the said device, and 3 and 4 the clamping blocks at and forming the opposite end of the device. These elements are all preferably made of any suitable metal, although any other material found suitable for the purpose may be employed. The long screw 5 passes through the blocks 4 and 3, and also through one end of the bar 2; and the blocks 3 and 4 firmly clamp in place one end of the insulating strip 7, the opposite end of said strip being secured to the block 1 by means of the long screw 6, which passes through the said strip 7, the block 1 and through the opposite end of the bar 2. The insulating strip 7 is wound with a coil of wire 8 forming a current conveying resistance coil extending a suitable distance along its length. Between the insulating strip 7 and the block 1 a thin, very flexible contact strip is held by the screw 6. This strip is resilient and extends from the block 1 to a point a short distance beyond the outer end of the coil 8, whereby the strip may have contact with the coil throughout its entire length or extent. Normally the resiliency of the strip 9 maintains it out of contact with the coil 8; but, contact of the conducting strip 9 with the coil 8 is brought about by the adjustable shoe or slide 10, the lower end of which is curved or upturned and bears extensively upon the strip 9, so as to properly control the action of the same. The shoe 10 is carried by an angular support 11 clamped to the inside of the bar 2 by means of the screw 12, the head of which slides along the outside of the bar and the shank of which slides within a groove 13 in said bar, said groove extending along the major portion of the length of the bar. The screw 12 may hold the support 11 more or less snugly against the inside of the bar 2 so as to give it a firm bearing against the bar and hold the shoe firmly for sliding contact with the strip 9. It is particularly noted that the insulating strip 7 with its resistance coil 8 is arranged at an inclination with reference to the bar 2, the inclination being such as to enable the shoe 10 to firmly depress the conducting strip 9 along its entire length against the coil 8, as the shoe 10 is adjusted, thus bringing about a firm and positive contact between the strip and coil. This is an important feature of my invention for reasons hereinafter stated.

Viewing Figure 3, it will be seen that my regulating or controlling device is applied to the bottom of the steering wheel of, for example, an automobile and is arranged on the bottom of and set in the rim of the wheel conveniently for manipulation by a finger of the hand of the driver. The device may be secured to the wheel flush with the surface thereof by the same screws 5 and 6 which hold the parts of the device together, the same being made sufficiently long for the purpose, as shown in Figure 3, or additional means may be used for the purpose of securing the device in place on the wheel.

Viewing Figure 2, my device is shown in a translation circuit, the same being, for example, the electric lighting system of an automobile, and therein the coil 8, constituting the resistance surrounding the insulating strip 7, is shown as connected at one end by lead 14 to the negative pole of the battery 15, a lead 16 extending from the positive pole of the battery to the lamp 17, for example, and a lead 18 extending from the said lamp to the opposite end of the coil 8. Thus the resistance is in series with the battery and lamp. Obviously, any number of lamps can be inserted in series between the leads 16 and 18, or elsewhere in the system, and it is also obvious that the source of current may be other than a battery such as indicated at 15.

The mode of operation will be readily understood upon reference to Figure 2, wherein it will be understood that, with the adjustment shown, the current from the battery will pass to the lamp or lamps, thence through the resistance coil and back to the battery, and thus the lamp or lamps will receive the minimum current and be dim by reason of the fact that all the coils of the resistance are in circuit. To increase the intensity of the lights, the shoe 10 is adjusted along the strip 9 by the finger of the driver through the medium of the screw 12, and according to the position of the shoe the contact strip 9 will be firmly pressed against a predetermined number of the coils of the resistance, thus cutting out some of the resistance and short circuiting the lamps,—the current passing through the conducting strip 9,—and increasing the brilliancy of the lamp or lamps. The shoe is easily shifted, little or no resistance being offered by the strip 9, since the latter is much more flexible than the shoe 10; that is to say, the shoe 10, though of resilient material, is considerably stiffer than the strip 9, thus causing the latter to be readily depressed and to go into firm contact with the coils of resistance 8.

There are many advantages derivable from the use of my regulating or controlling device, and among them may be noted the fact that arcing of the current is completely eliminated or cannot occur by reason of the fact that contact of the strip 9 with the coil 8 is not broken, and, consequently, the current passing through the coil is not interrupted. Heating cannot occur in my device, due to the great contact area of the strip 9 with the coil 8. There is no corrosive action in my device, due to the fact that no wear occurs between the coil and the strip during the action of the latter; that is to say, the contact is made directly and positively and not by frictional or sliding engagement. The wiring is simple, and there are no contact points or buttons, in consequence of which the resistance coil has great longevity due to the absence of wear or friction thereon. The contact between the strip 9 and the coil 8 is positive, due to the angle at which the coil is set relatively to the conducting strip 9; and the contact is rapid for a short movement of the shoe 10. The device is strong, durable, small in size and very compact, and all the parts are of simple design, readily removed and replaced, and none of the parts is fragile. All these advantages are of great importance in devices of this kind, and upon them I lay stress as pointing to important features of my invention.

Having thus described my invention, what I claim and desire to secure by Letters Patent is:

1. The combination with a source of electric current and a normally closed translation circuit, means for controlling the current in the circuit and normally holding it at minimum, comprising a resistance coil and a flexible contact strip, normally out of contact with said coil, means for pressing the strip more or less against the coil, and means for increasing the pressure of the strip upon the coil in proportion to the area of contact between the two.

2. The combination with a source of electric current and a normally closed translation circuit, means for controlling the current in the circuit and normally holding it at minimum, comprising a resistance coil and a flexible contact strip, normally out of contact with said coil, having one end fixed relatively to the coil and the other end widely separated therefrom, means for pressing the strip more or less against the coil, and means for increasing the pressure of the strip upon the coil in proportion to the area of contact between the two.

3. In combination with an electric circuit, a controller therefor including a resistance in the circuit for holding the current normally at minimum, a contact device for variably engaging the resistance, but normally out of contact therewith, and means mounted to travel along the length of the contact device to cause the same to engage the resistance at constantly increasing pressure for varying the effect thereof on the resistance without overheating.

4. A controller for electric circuits comprising a slotted bar, an insulating strip arranged at an angle to the bar, a resistance coil wound about the strip and inserted in the circuit, a contact plate adapted to engage the coil throughout its length, and means mounted on the bar and adjustable in the slot thereof and relatively to the plate to cause the latter to engage the resistance coil more or less throughout its length and with variations of pressure.

5. A controller for electric circuits comprising a supporting bar, an insulating strip mounted on the bar at an angle thereto, a resistance coil surrounding the strip, a contact plate between the strip and bar, and a shoe for engaging the plate to cause the same to more or less engage the resistance coil along its length, and means for supporting the shoe on the bar and adjusting the same along the length of the bar relatively to the plate.

EDMUND H. HANSEN.